United States Patent
Lu et al.

(10) Patent No.: US 8,432,052 B2
(45) Date of Patent: Apr. 30, 2013

(54) WIND POWER CONVERTER SYSTEM WITH GRID SIDE REACTIVE POWER CONTROL

(75) Inventors: Haihui Lu, Haihui (CN); Lixiang Wei, Whitefish Bay, WI (US); Richard A. Lukaszewski, New Berlin, WI (US); Russel J. Kerkman, Milwaukee, WI (US); Zhenhuan Yuan, Shanghai (CN)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 401 days.

(21) Appl. No.: 12/789,285

(22) Filed: May 27, 2010

(65) Prior Publication Data

US 2011/0295437 A1 Dec. 1, 2011

(51) Int. Cl.
*H02P 9/04* (2006.01)
*G05D 3/12* (2006.01)

(52) U.S. Cl.
USPC .............................. 290/44; 700/286; 700/287

(58) Field of Classification Search .................... 290/44; 700/286, 287
See application file for complete search history.

(56) References Cited

U.S. PATENT DOCUMENTS

| | | | | |
|---|---|---|---|---|
| 5,225,712 A | * | 7/1993 | Erdman | 290/44 |
| 7,242,166 B2 | * | 7/2007 | Swahn et al. | 322/28 |
| 8,049,352 B2 | * | 11/2011 | Jorgensen et al. | 290/44 |
| 8,198,742 B2 | * | 6/2012 | Jorgensen et al. | 290/44 |
| RE43,698 E | * | 10/2012 | Hudson | 290/44 |
| 2009/0160187 A1 | * | 6/2009 | Scholte-Wassink | 290/44 |
| 2009/0278352 A1 | * | 11/2009 | Rivas et al. | 290/44 |
| 2010/0327584 A1 | * | 12/2010 | Fortmann | 290/44 |
| 2011/0156389 A1 | * | 6/2011 | Arlaban Gabeiras et al. | 290/44 |

* cited by examiner

*Primary Examiner* — Bao Q Vu
*Assistant Examiner* — Zekre Tsehaye
(74) *Attorney, Agent, or Firm* — Fletcher Yoder, P.C.; Alexander R. Kuszewski; John M. Miller

(57) ABSTRACT

The present techniques include methods and systems for operating a wind power system to maintain a lifespan of the rotor side converter. In some embodiments, the current of the rotor side converter may be minimized to reduce the stress and/or junction temperature variation in the switching transistors and bond wires of the converter. More specifically, embodiments involve using a minimal current in the rotor side converter based on the rotor side and grid side reactive powers. If the grid side reactive power is greater than a maximum grid side reactive power, the grid side reactive power may be reduced. Further, if the total reactive power does not meet the grid reactive power requirements, the minimal current in the rotor side converter may be adjusted such that the system may sufficiently power the grid.

10 Claims, 4 Drawing Sheets

WIND POWER CONVERTER SYSTEM WITH GRID SIDE REACTIVE POWER CONTROL

BACKGROUND

The invention relates generally to the field of electrical power converters and inverters. More particularly, the invention relates to techniques for preventing or forestalling failure of motor drive circuitry due to overheating.

Power inverters and converters typically employ power modules to create a desired output current waveform, which is used to power various devices, such as motors and other equipment. The frequency and amplitude of the output current waveform may affect the operation of the device such as by changing the speed or torque of a motor, for example. Some power modules create the desired output current waveform through pulse width modulation, wherein power semiconductor switches in the converter or inverter, such as insulated gate bipolar transistors (IGBTs), are switched rapidly on and off in a particular sequence so as to create an approximately sinusoidal output current waveform. Furthermore, high IGBT switching speeds tend to produce a smoother, more ideal sinusoidal waveform, which may be desirable in some applications. For example, in heating, ventilating, and air conditioning systems a smoother sinusoidal waveform will reduce system noise and vibrations.

Higher IGBT switching speeds may tend, however, to increase the junction temperature of the IGBTs, which may result in more mechanical stress and increased rates of IGBT failure over time. Attempts have been made to reduce IGBT failure by limiting the maximum absolute IGBT junction temperatures. However, these techniques do not account for the increased stresses that tend to occur under start-up conditions or low-speed conditions, wherein the IGBTs tend to experience high current at low output frequency. For example, a power converter of the rotor side of a wind system may typically operate under low speed conditions (e.g., −10 Hz to 10 Hz) for a substantial portion of the lifetime of the converter. Such low speed conditions may contribute to electrical failures of the converter.

It may be advantageous, therefore, to provide a system and method of reducing IGBT thermal stress that is particularly effective under start-up conditions and low-speed, high-current conditions. Specifically, it may be advantageous to provide a method of controlling the reactive power in the grid side converter to improve the lifetime of a converter in a wind power system.

BRIEF DESCRIPTION

The present invention relates generally to operating a rotor side converter and controlling a reactive power of a grid side converter to forestall converter failures in wind power converter systems. Embodiments include systems and methods of forestalling converter failures by minimizing the rotor side converter current while generating a total reactive power to meet the reactive power required by the grid.

DRAWINGS

These and other features, aspects, and advantages of the present invention will become better understood when the following detailed description is read with reference to the accompanying drawings in which like characters represent like parts throughout the drawings, wherein.

Figure 3:
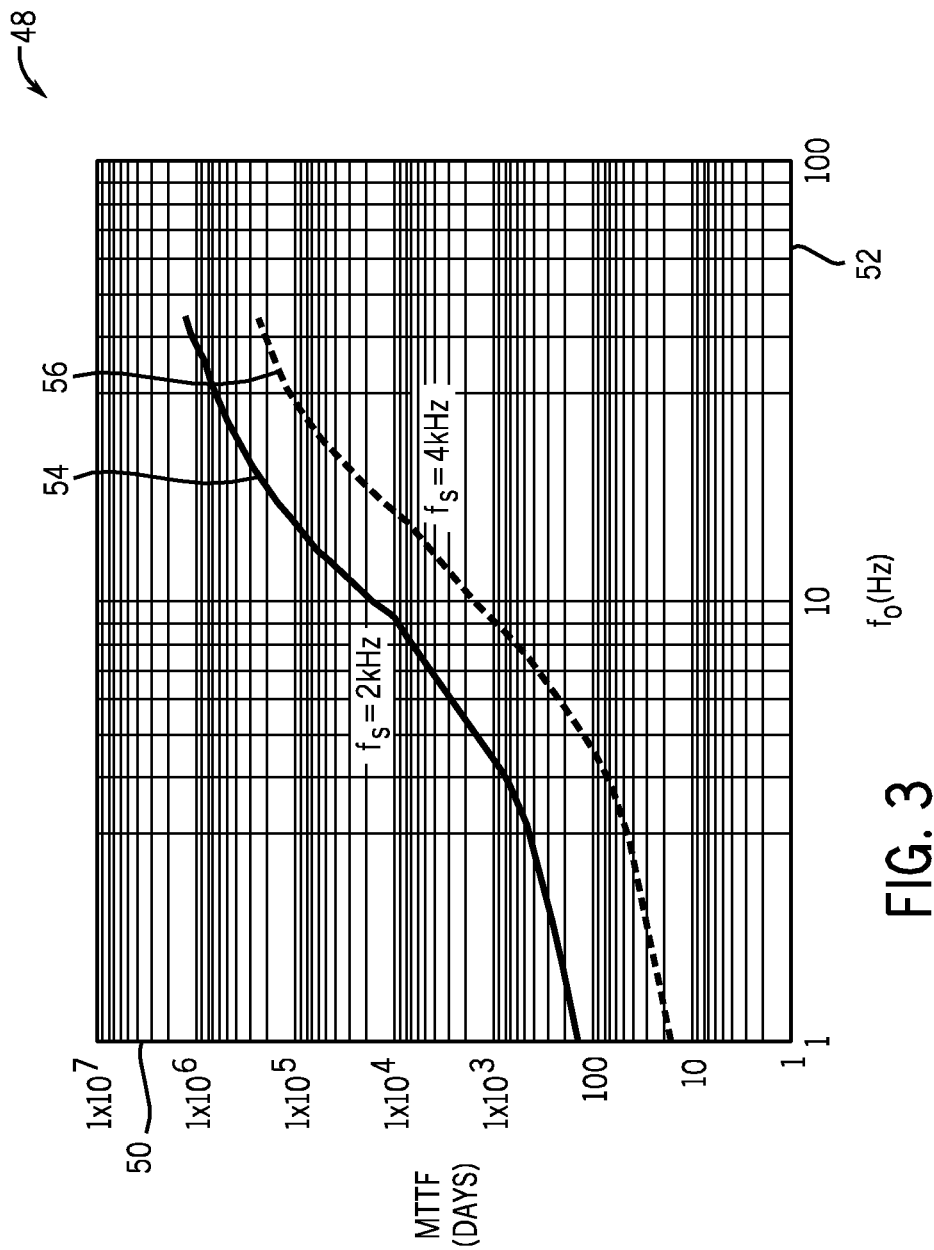
Figure 4:
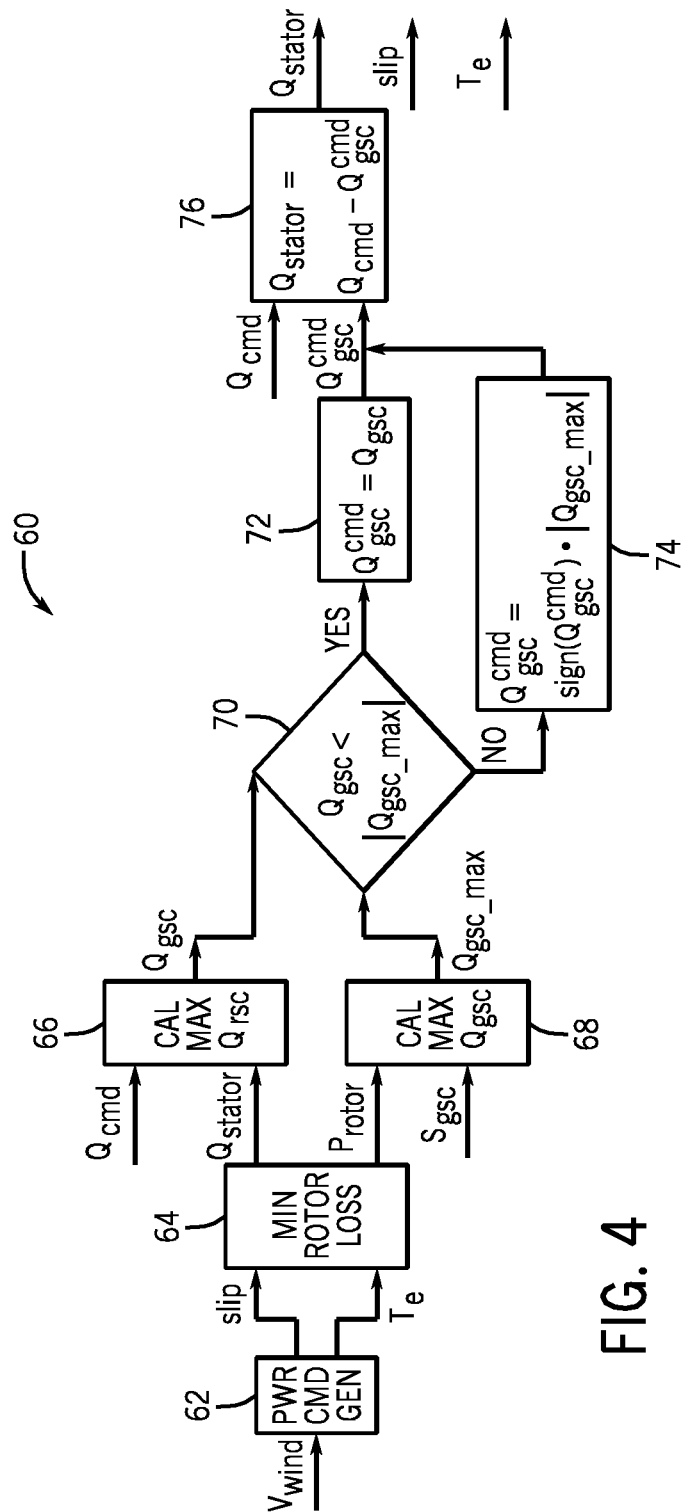

FIG. 3 is a plot representing the relationship between a mean time to failure of a converter and an operating frequency of the converter for different switching frequencies, in accordance with an embodiment of the present techniques; and FIG. 4 is a flow chart summarizing a process for controlling the reactive power of a grid side converter, in accordance with an embodiment of the present techniques.

DETAILED DESCRIPTION

Embodiments of the present invention address electrical system failures of converter systems by providing a grid requirement for reactive power while operating with minimal current at the rotor side converter. These techniques may be used in a variety of settings, both for motor drives and other loads with regenerative capabilities, and for power generators, such as doubly fed wind turbine power generators. Typically, electrical system failures may result from prolonged operation of the rotor side converter under high current and low frequency conditions. Operating the system with a minimal current at the rotor side converter may result in a longer lasting converter module. Further, the grid side converter may be monitored, and the minimal current at the rotor side converter may be adjusted, such that the system may output the reactive power required by the grid.

Figure 1:
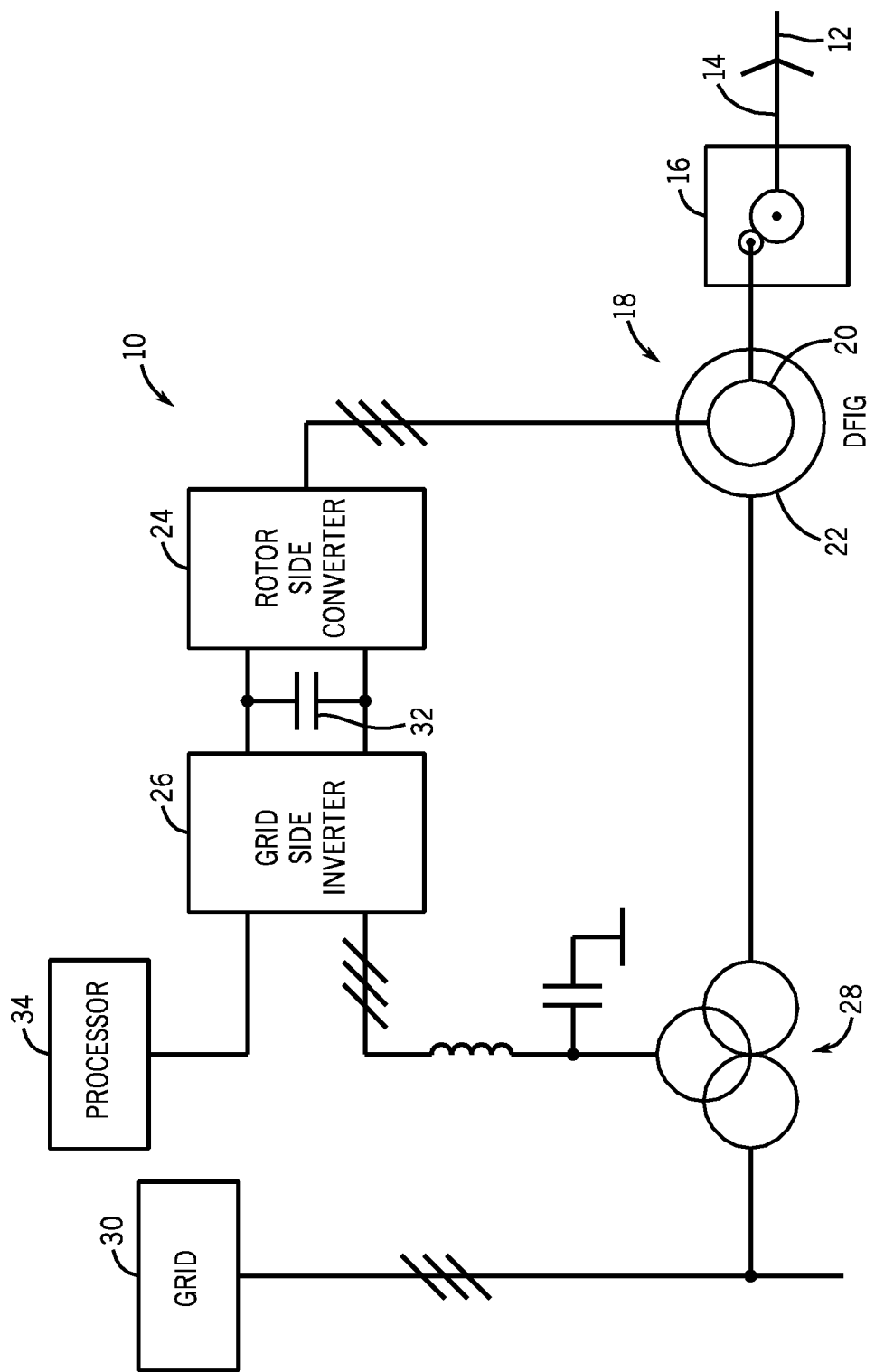
FIG. 1 is a block diagram of an exemplary application for a variable frequency drive, in the form of a wind power converter system which may include an adjustable speed inverter, in accordance with an embodiment of the present techniques.

Turning to the figures, FIG. 1 depicts an exemplary application in the form of a wind power system 10 which may include an adjustable speed inverter, in accordance with the present disclosure. The wind power system 10 may be suitable for capturing power from wind using turbine blades 12 and converting the captured wind power into mechanical power, and the mechanical power into electrical power. The system 10 may include a gearbox 16 connected to the turbine rotor 14 of the turbine blades 12. The gearbox 16 adapts the relatively low speed of the turbine rotor 14 with the relatively high speed of a generator 18.

The generator 18 converts the mechanical power into electrical power, and may be, for example, an induction generator or a synchronous generator. For example, the generator 18 illustrated in FIG. 1 may be a doubly fed induction generator (DFIG), which includes a rotor winding 20 and a stator winding 22. In the illustrated embodiment, the stator winding 22 of the generator 18 is connected to a transformer 28 which transfers electrical power through inductively coupled conductors to a suitable voltage level for an electrical grid 30. The grid 30 may be an interconnected network which delivers electrical power to various other electrical devices or networks. The rotor winding 20 of the generator 18 may be connected to the grid 30 by a converter and inverter module (e.g., the converters 24 and 26) which decouple mechanical and electrical frequencies (e.g., to enable variable-speed operation).

The converter and inverter module of the system 10 may include two three-phase converters 24 and 26. For example, in some embodiments, the system may include an AC-DC converter 24 and a three-phase DC-AC inverter 26. In some embodiments, the converters 24 and 26, linked by a DC capacitor battery 32, transfer active power and reactive power in both directions (AC-DC and DC-AC). The converter 24 may be connected to the rotor winding 20 of the generator 18, and may also be referred to as the rotor side converter 24. The converter 26 may be connected to the grid 30 by the transformer 28, and may also be referred to as the grid side converter 26. The bidirectional converters 24 and 26 may enable vector control of the active and reactive powers delivered to the grid 30 and may also increase power quality and angular stability and decrease the harmonic content introduced into the grid 30 (e.g., via filters).

The converters 24 and 26 may be used for varying levels of power control, and may sometimes output relatively high power (voltage and current). The converters 24 and 26 may each include transistors and antiparallel diodes for switching and converting such voltages. In some embodiments, the system 10 may include one or more processors 34 for controlling one or more operations of the converters 24 and 26. For example, and as will be discussed, the processor 34 may control or minimize the current of the rotor side converter 26 which decreases the power loss at the rotor side converter 26. The processor 34 may also monitor the reactive power output by the grid side converter 24 and determine whether the power output by the grid side converter 24 meets the reactive power required by the grid 30. The processor 34 may further be suitable for executing algorithms and computing parameters associated with operations of the converters 24 and 26.

Figure 2:
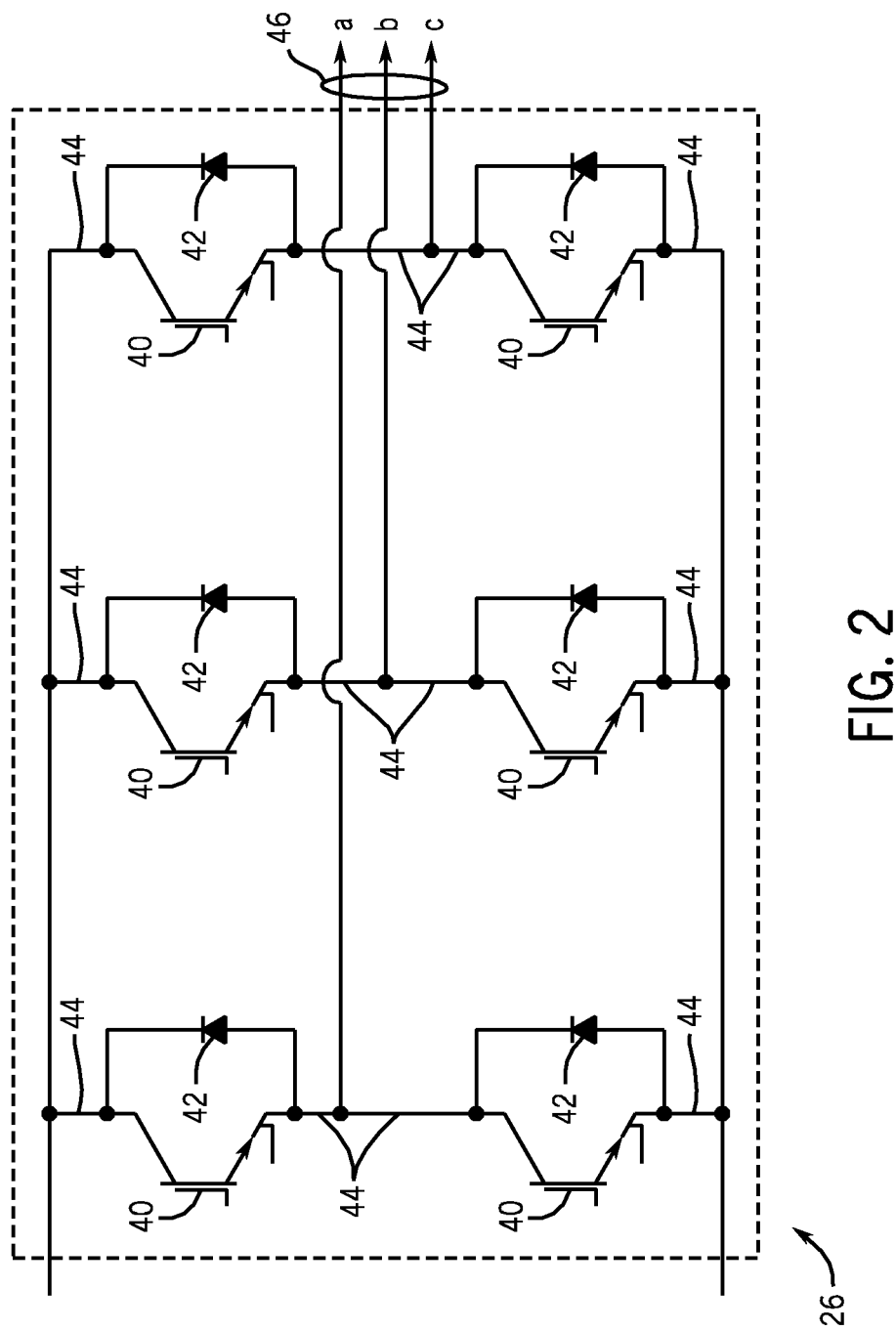
FIG. 2 illustrates a schematic diagram of an inverter in the exemplary application of FIG. 1, in accordance with an embodiment of the present techniques.

One example of a converter 24 or 26 in some embodiments is provided in FIG. 2. The converter 24 or 26 may include a plurality of insulated gate bipolar transistors (IGBTs) 40 and power diodes 42, each diode 42 configured antiparallel to a respective IGBT 40. The IGBTs 40 and power diodes 42 are joined to positive or negative DC lines (as appropriate) and output lines a, b, or c with bond wires 44. For example, the output lines a, b, and c of the output 46 may output the three-phase voltages $v_a$, $v_b$, and $v_c$. The rapid on and off switching of the IGBTs 40 to produce a discretized three-phase output current waveform at the output 46 may result in power losses, which may result in a higher junction temperature at the IGBTs 40. Such junction temperatures may result in mechanical strain and/or deformation of the bond wires 44, which may shorten the lifespan of the converter 26.

For example, FIG. 3 illustrates a plot 48 representing a mean time to failure (MTTF) 50 of a converter through a range of operating frequencies 52. Typically, converters of DFIGs experience a higher current at lower operating frequencies 52. The higher current may result in higher junction temperature variations and mechanical stresses on the IGBTs 40 and bond wires 44 in a converter 24. As depicted in the plot 48, operating the converter 24 at lower operating frequencies 52 (e.g., less than 10 Hz on the plot 48) may reduce the MTTF 50 of the converter 24. Further, MTTF 50 may also be affected by different switching frequencies of the IGBTs 40. For example, a higher switching frequency 56 at 4 kHz may result in a lower MTTF 50 than a relatively lower switching frequency 54 at 2 kHz.

In some embodiments, the reduction in lifetime of the converter 24 due to mechanical stress and increased junction temperature variation may be estimated by determining the power loss of the IGBTs 40 in the converter 24. Such power loss may be calculated based on estimated operating conditions of the IGBTs 40. For example, peak IGBT 40 junction temperature estimates may be based on approximated conduction power losses and switching power losses as calculated according to the following equations:

$$P_c(f, I_{RMS}) = \left(\frac{1}{2\cdot\pi} + \frac{M(f)\cdot PF}{8}\right)\cdot V_t \cdot \sqrt{2} \cdot I_{RMS} + \left(\frac{1}{8} + \frac{M(f)\cdot PF}{3\cdot\pi}\right)\cdot R_t \cdot 2 \cdot I_{RMS}^2, \quad (1)$$

$$P_s(f_s, I_{RMS}) = \frac{1}{\pi}\cdot f_s \cdot E_{onoff} \cdot \left(\frac{\sqrt{2}\cdot I_{RMS}}{I_{nom}}\right)\cdot \left(\frac{V_{DC}}{V_{nom}}\right), \text{ and} \quad (2)$$

$$P(f, f_s, I_{RMS}) = P_c(f, I_{RMS}) + P_s(f_s, I_{RMS}), \quad (3)$$

where $P_c$ is the estimated conduction power loss as a function of the fundamental frequency, f, and the output RMS current of the drive, $I_{RMS}$, $P_s$ is the estimated switching power losses as a function of the switching frequency, $f_s$ and the output RMS current of the drive, $I_{RMS}$, and $P(f, f_s, I_{RMS})$ is the total estimated power losses of the IGBT 40. In equation (1), M(f) represents the modulation index and PF represents the power factor of a load driven by the converter 24. In equation (1), $V_t$ represents the approximate IGBT 40 conduction voltage at small or near zero forward current and $R_t$ represents the approximate slope resistance. Both $V_t$ and $R_t$ may be derived from a manufacturer datasheet for the transistor (e.g., IGBT 40) used in the converter 24. In equation (2), $E_{onoff}$ represents the total energy required to switch the IGBT 40 on and off at a rated voltage $V_{nom}$ (half of the IGBT rated voltage) and current $I_{nom}$ (rated IGBT module current) of the IGBT 40. All three of $E_{onoff}$, $V_{nom}$, and $I_{nom}$ may be obtained from manufacturer data sheets or directly and/or dynamically measured. $I_{RMS}$ and $V_{DC}$ represent the estimated output current and bus voltage of the IGBT 40.

Therefore, the current $I_{RMS}$ acts as a scaling factor which contributes to the total power loss P. The total power loss P affects the junction temperature variation of the converter 24, which causes mechanical stress on the IGBTs 40 and bond wires 44, decreasing the lifespan of the converter 24. One or more embodiments include techniques for minimizing the current in the rotor side converter 24 to reduce power loss and stress, possibly increasing the lifetime of the rotor side converter 24. However, in some embodiments, decreasing the rotor side converter 24 current decreases the reactive power at the stator windings 22 and lowers the total reactive power delivered to the grid 30.

For example, the equations below provide a relationship between the reactive power of the rotor windings and the reactive power of the stator windings:

$$Q_s = 1.5(v_{qs}i_{ds} - v_{ds}i_{qs}) \quad (4) \text{ and}$$

$$Q_r = 1.5(v_{qr}i_{dr} - v_{dr}i_{qr}) \quad (5),$$

where equations representing the abc to dq coordinate transformations are defined as:

$$x_q = \frac{2}{3}(x_a \cdot \cos(\gamma) + x_b\cos(\gamma - 2\pi/3) + x_c\cos(\gamma + 2\pi/3)) \quad (6)$$

$$x_d = \frac{2}{3}(x_a \cdot \sin(\gamma) + x_b\sin(\gamma - 2\pi/3) + x_c\sin(\gamma + 2\pi/3)) \quad (7)$$

wherein x may represent the voltage, current, flux, etc for the motor. In equations (4) and (5), $Q_s$ represents the stator side reactive power and $Q_r$ represents the rotor side reactive power. In the above equations, s subscript refers to the stator side, the r subscript refers to the rotor side, the q subscript refers to torque, and the d subscript refers to flux. The steady state torque and flux voltages at the rotor and stator sides may be characterized by the equations below:

$$v_{ds}=R_s i_{ds}-\omega_e(L_s i_{qs}+L_m i_{qr}) \quad (8),$$

$$v_{qs}=R_s i_{qs}+\omega_e(L_s i_{ds}+L_m i_{dr}) \quad (9),$$

$$v_{dr}=R_r i_{dr}-\omega_{slip}(L_m i_{qs}+L_r i_{qr}) \quad (10) \text{ and}$$

$$v_{qr}=R_r i_{qr}+\omega_{slip}(L_m i_{ds}+L_r i_{dr}) \quad (11).$$

In some embodiments, and as previously discussed, the rotor side current may be minimized to decrease power losses to possibly prolong the lifespan of the rotor side converter 24. For example, the current driven through the rotor side converter 24 may be represented by equations (12)-(15) below. It should be noted that the equations (12)-(15) merely represent examples and approximations of operating conditions where the rotor side current is reduced or minimized. In some embodiments, minimizing or reducing the rotor side current may have different approximations and may be represented by different equations, depending on the configuration of the wind power system 10. For example, in some embodiments, the minimized rotor side current may be a current having the smallest total magnitude, or having the smallest magnitude of flux or torque components, which enables the system 10 to suitably power the grid 10. Furthermore, in some embodiments, the rotor side current values may be continuously adjusted to meet a total reactive power required by the grid 30. More specifically, the minimal rotor side current which forestalls converter failure and enables the reactive power for meeting grid requirements may vary over the operation of the wind power system 10.

In one embodiment of minimizing the rotor side current, the current relationships under stator flux oriented conditions (and neglecting the effect of the stator resistances) are represented below:

$$i_{qr} = k \frac{T_e}{\psi_m}, \quad (12)$$

$$i_{dr} = 0, \quad (13)$$

$$i_{ds} = \frac{\psi_m}{L_s} \text{ and} \quad (14)$$

$$i_{qs} = -\frac{L_m i_{qr}}{L_s}, \quad (15)$$

where k in equation (12) is a constant and the flux rotor current $i_{dr}$ is approximately zero, as indicated in equation (13). As demonstrated by the rotor side reactive power equation (4) and the corresponding rotor voltage equations (10) and (11), minimizing the reactive rotor current $i_{dr}$ to zero also reduces the rotor side reactive power $Q_r$. Further, minimizing the reactive rotor current $i_{dr}$ to zero also affects the stator side reactive power $Q_s$, as indicated by equation (5) and the corresponding stator voltage equations (8) and (9). However, reducing the rotor side reactive power $Q_r$ and the stator side reactive power $Q_s$ reduces the overall reactive power delivered to the grid 30, compromising the reactive power requirement of the wind power system 10.

In one or more embodiments, the rotor side current may be controlled and/or minimized to prolong the lifespan of the rotor side converter 24, and the reactive power of the grid side converter 26 may also be controlled to meet the reactive power requirement of the grid 30. One technique may be represented by the flow chart of the process 60 in FIG. 4. The process may begin by measuring the wind speed $V_{wind}$. Based on the wind speed $V_{wind}$, the slip of the generator (e.g., DFIG 18) and the electrical torque $T_e$ may be determined. In some embodiments, the process 60 may determine (block 62) the slip and electrical torque $T_e$ based on an operation of the system 10. For example, the process 60 may determine (block 62) the slip and electrical torque $T_e$ based on a look-up table corresponding to a commanded power of the DFIG 18. The slip and electrical torque $T_e$ may then be used to calculate (block 64) the commanded stator side reactive power $Q_{stator}$ and the rotor side active power $P_{rotor}$ (which may be substantially the same as the grid side converter active power), using the equations below, $$Q_{stator} \approx 1.5 \frac{\psi_m}{L_s} v_{qs} \approx 1.5 \frac{\psi_m}{L_s} \cdot V_s \text{ and} \quad (16)$$

$$P_{rotor} = 1.5 s \cdot T_e \cdot \omega_e, \quad (17)$$

where s is $\omega_s/\omega_e$ and represents the slip of the generator (DFIG 18), $\omega_e$ is the synchronous speed of the rotor 14, $V_s$ is the supplied phase voltage amplitude, and $\psi_m = V_s/\omega_e$. Each of the $Q_{stator}$ and $P_{rotor}$ calculations may be made in SI units.

The stator side reactive power $Q_{stator}$, or the power at the stator winding of the DFIG 18 resulting from minimizing rotor side current may be used to calculate (block 66) the reactive power of the grid side converter $Q_{gsc}$, using the following equation, $$Q_{gsc} = Q_{cmd} - Q_{stator} \quad (18),$$

where $Q_{cmd}$ is the reactive power commanded by the grid 30 and may be obtained as an input value from the grid 30. The rotor side active power $P_{rotor}$, which may be approximately equal to the active power passing through grid side converter, may be used to calculate (block 68) the maximum reactive power allowed by the grid side converter using the equation below, $$Q_{gsc\_max} = \sqrt{(S_{gsc}^2 - P_{rotor}^2)} \quad (19),$$

where $S_{gsc}$ is further defined by the equation below:

$$S_{gsc} = \sqrt{3} V_{sl} I_{gsc} \quad (20).$$

In the above equation, $I_{gsc}$ is the maximum allowed steady state RMS grid side converter current and $V_{sl}$ is the line to line RMS voltage.

The process 60 may then compare (block 70) the calculated grid side reactive power $Q_{gsc}$ and the maximum reactive power $Q_{gsc\_max}$ allowed by the grid side converter under maximum power point tracking (MPPT) operation. If the calculated grid side reactive power $Q_{gsc}$ is higher than the maximum reactive power $Q_{gsc\_max}$, then the process 60 may set (block 74) the grid side converter reactive power to approximately the maximum reactive power $Q_{gsc\_max}$. Further, after the reactive power of the grid side converter is set to the stator side reactive power may also be recalculated based on the reset grid side converter reactive power to meet the grid 30 requirements. The process 60 may adjust the current of the rotor side converter 24 (e.g., increase the current) to meet the reactive power requirements of the grid 30. Therefore, by maintaining the grid side reactive power $Q_{gsc}$ within a maximum reactive power $Q_{gsc\_max}$ threshold under MPPT operation, the process 60 minimizes the rotor current required to generate the total reactive power required by the grid 30. More specifically, the rotor side converter 24 current used in the process 60 may be the minimal current required to meet the reactive power commanded by the grid 30, as the current may be increased only when grid 30 requirements are not met. It should be noted that in some embodiments, the grid side reactive power $Q_{gsc}$ may also be set such that the system 10 operates in a non-MPPT mode (e.g., beneath the MPPT mode). For example, the process 60 may adjust the current of the rotor side converter 24 such that grid 30 requirements are met, even while the system is not operating in MPPT mode.

If the calculated grid side reactive power $Q_{gsc}$ is already equal to or less than the maximum reactive power $Q_{gsc\_max}$, the process 60 may maintain (block 72) the commanded reactive power of the grid side converter $Q_{gsc}^{cmd}$ to be same as the calculated grid side converter reactive power $Q_{gsc}$. In some embodiments, the process 60 may still compare the total reactive power with the command reactive power and adjust the current such that the system 10 may meet the total reactive power required by the grid 30.

In some embodiments, the process 60 may be iterative, and the grid side converter reactive power command $Q_{gsc}^{cmd}$ may be used to recalculate (block 76) the commanded stator side reactive power $Q_{stator}$, and the slip and electric torque $T_e$ information may also be refreshed based on current wind speed $V_{wind}$. In some embodiments, the process 60 may be performed dynamically or performed at intervals. For example, the process 60 may be performed at set time intervals, or the process 60 may be performed whenever operating changes in the system 10 occur. By continuously applying the process 60, sufficient reactive power may be delivered to meet the requirements of the grid 30, even while the rotor side converter 24 is operating with minimized current values. Therefore, a desired lifespan of the rotor side converter 24 may be maintained, possibly increasing the lifespan and/or efficiency of the entire system 10 while still substantially meeting the requirements of the grid 30.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a power system, the method comprising:
   operating a rotor side converter of the power system with a minimal current, wherein the minimal current comprises approximately zero flux current;
   calculating a grid reactive power generated by a grid side converter of the power system;
   comparing the calculated reactive power with a maximum reactive power of the grid side converter;
   setting a reactive power command of the grid side converter to the maximum reactive power when the calculated reactive power is greater than the maximum reactive power;
   calculating a stator reactive power based on a total reactive power of the power system and the reactive power command of the grid side converter; and
   adjusting the minimal current to generate the stator reactive power.

2. The method of claim 1, wherein operating the rotor side converter with the minimal current comprises operating the rotor side converter with only torque current.

3. The method of claim 1, wherein calculating the grid reactive power comprises subtracting the required stator reactive power from the reactive power command.

4. The method of claim 1, comprising calculating the maximum reactive power based on an active power through the grid side converter or a rotor side converter, a supply voltage, and a grid side converter current.

5. The method of claim 1, comprising increasing the stator reactive power if the total reactive power does not substantially equal the reactive power command.

6. The method of claim 1, wherein adjusting the minimal current comprises increasing the minimal current to a current value at which the total reactive power substantially equals the reactive power command.

7. The method of claim 1, wherein the method is performed dynamically during operation of the power system.

8. The method of claim 1, wherein the method is performed at set time intervals.

9. The method of claim 1, wherein the method is performed whenever operating parameters of the power system change to result in calculating a different total reactive power.

10. A non-transitory computer readable medium comprising code carried out by one or more processors for control of power converters, the code being configured for executing the steps of:
    operating a rotor side converter of a power system with a minimal current, wherein the minimal current comprises approximately zero flux current;
    calculating a grid reactive power generated by a grid side converter;
    comparing the calculated grid reactive power with a maximum reactive power of the grid side converter;
    resetting the grid reactive power command to the maximum reactive power when the calculated grid reactive power is greater than the maximum reactive power;
    calculating a stator reactive power based on a total reactive power of the power system and the reactive power command of the grid side converter; and adjusting the minimal current to generate the stator reactive power.

* * * * *